(12) United States Patent
Demuynck et al.

(10) Patent No.: US 8,280,318 B2
(45) Date of Patent: Oct. 2, 2012

(54) CORE MODEM ASSEMBLY FOR MOBILE COMMUNICATION DEVICE

(75) Inventors: Randolph Cary Demuynck, Wake Forest, NC (US); David Ryan Story, Holly Springs, NC (US)

(73) Assignee: Sony Mobile Communications AB, Lund (SE)

( * ) Notice: Subject to any disclaimer, the term of this patent is extended or adjusted under 35 U.S.C. 154(b) by 526 days.

(21) Appl. No.: 12/542,225

(22) Filed: Aug. 17, 2009

(65) Prior Publication Data

US 2011/0038401 A1    Feb. 17, 2011

(51) Int. Cl.
*H04B 1/38* (2006.01)

(52) U.S. Cl. .................................. 455/90.3
(58) Field of Classification Search ............... 455/90.3
See application file for complete search history.

(56) References Cited

U.S. PATENT DOCUMENTS

| | | |
|---|---|---|
| 2002/0049042 A1 | 4/2002 | Oida et al. |
| 2002/0079568 A1 | 6/2002 | Degani et al. |
| 2003/0060172 A1 | 3/2003 | Kuriyama et al. |
| 2008/0157295 A1 | 7/2008 | Nuytkens et al. |

OTHER PUBLICATIONS

International Search Report mailed May 25, 2010 re International Application No. PCT/US2010/025195.

*Primary Examiner* — Matthew Anderson
*Assistant Examiner* — David Bilodeau
(74) *Attorney, Agent, or Firm* — Coats & Bennett, P.L.L.C.

(57) ABSTRACT

The invention described herein provides a core modem assembly for a communication circuit that is well suited for mobile communication devices such as cellular phones, personal digital assistants, laptop computers, and hand-held computers. The core modem assembly comprises a baseband module, an RF module, and a socket connector that provides electrical isolation between the baseband module and RF module. The core modem assembly achieves a very small form factor and provides shielding between the baseband module and RF module. Further, the core modem assembly uses a "plug and play" design allowing late customization and interchangeability of the modules.

19 Claims, 3 Drawing Sheets

CORE MODEM ASSEMBLY FOR MOBILE COMMUNICATION DEVICE

BACKGROUND

The present invention relates generally to the mounting of circuit components to a circuit board in mobile communication devices or other electronic devices and, more particularly, to a method and apparatus for mounting circuit components to provide electrical isolation between a radio frequency module and baseband module in a mobile communication device.

Electromagnetic interference is a common and well known problem associated with mobile communication devices such as cellular phones, personal digital assistants, laptop computers, and hand-held computers. In normal operation, the RF (radio frequency) module in a mobile communication device creates electromagnetic waves which induce undesirable signals that interfere with the normal operation of baseband circuits and other circuit elements in the mobile communication device. These undesirable signals, termed electromagnetic or RF interference, can be minimized by shielding the RF module within a conductive shield at a low or ground potential. The grounded electromagnetic shield dissipates electrostatic build up and absorbs the electromagnetic field thereby isolating the RF module from other circuit components.

One of the challenges facing mobile phone manufacturers is providing adequate shielding between the RF module and baseband module of the mobile phone while maintaining a small form factor.

SUMMARY

The present invention relates to a communication circuit with a core modem assembly that is well suited for mobile communication devices such as cellular phones, personal digital assistants, laptop computers, and hand-held computers. The core modem assembly comprises a baseband module, an RF module, and a socket connector that provides electrical isolation between the baseband module and RF module. The core modem assembly achieves a very small form factor and provides shielding between the baseband module and RF module. Further, the core modem assembly uses a "plug and play" design allowing late customization and interchangeability of the modules.

Exemplary embodiments of the invention comprise a core modem assembly for a mobile communication device. One exemplary core modem assembly comprises a radio frequency module comprising a first substrate and one or more radio frequency components mounted to a bottom surface of the first substrate; a baseband module comprising a second substrate and one or more baseband components mounted to a top surface of the second substrate; and a socket connector for mounting the radio frequency module and the baseband module to a main circuit. The socket connector may comprise a frame including a first mounting surface for mounting the radio frequency module and a second mounting surface higher than the first mounting surface for mounting the baseband module above the radio frequency module to provide a predetermined vertical separation between the radio frequency module and the baseband module, a first set of signal contacts disposed on the first mounting surface for making electrical connections with the radio frequency module, and a second set of contacts on the second mounting surface for making electrical connections with the baseband module.

Other exemplary embodiments of the invention comprise a communication circuit for a mobile communication device. One exemplary communication circuit comprises a main circuit; a radio frequency module comprising a first substrate and one or more radio frequency components mounted to a bottom surface of the first substrate; a baseband module comprising a second substrate and one or more baseband components mounted to a top surface of the second substrate; and a socket connector for mounting the radio frequency module and the baseband module to the main circuit. The socket connector may comprise a frame including a first mounting surface disposed adjacent an interior opening of the socket connector for mounting the radio frequency module and a second mounting surface disposed adjacent the outer perimeter of the socket connector and higher than the first mounting surface for mounting the baseband module above the radio frequency module to provide a predetermined vertical separation between the radio frequency module and the baseband module, a first set of signal contacts disposed on the first mounting surface for making electrical connections with the radio frequency module, and a second set of contacts on the second mounting surface for making electrical connections with the baseband module; and a set of ground contacts on the second mounting surface to provide ground connections for the baseband module.

DETAILED DESCRIPTION

Figure 1:
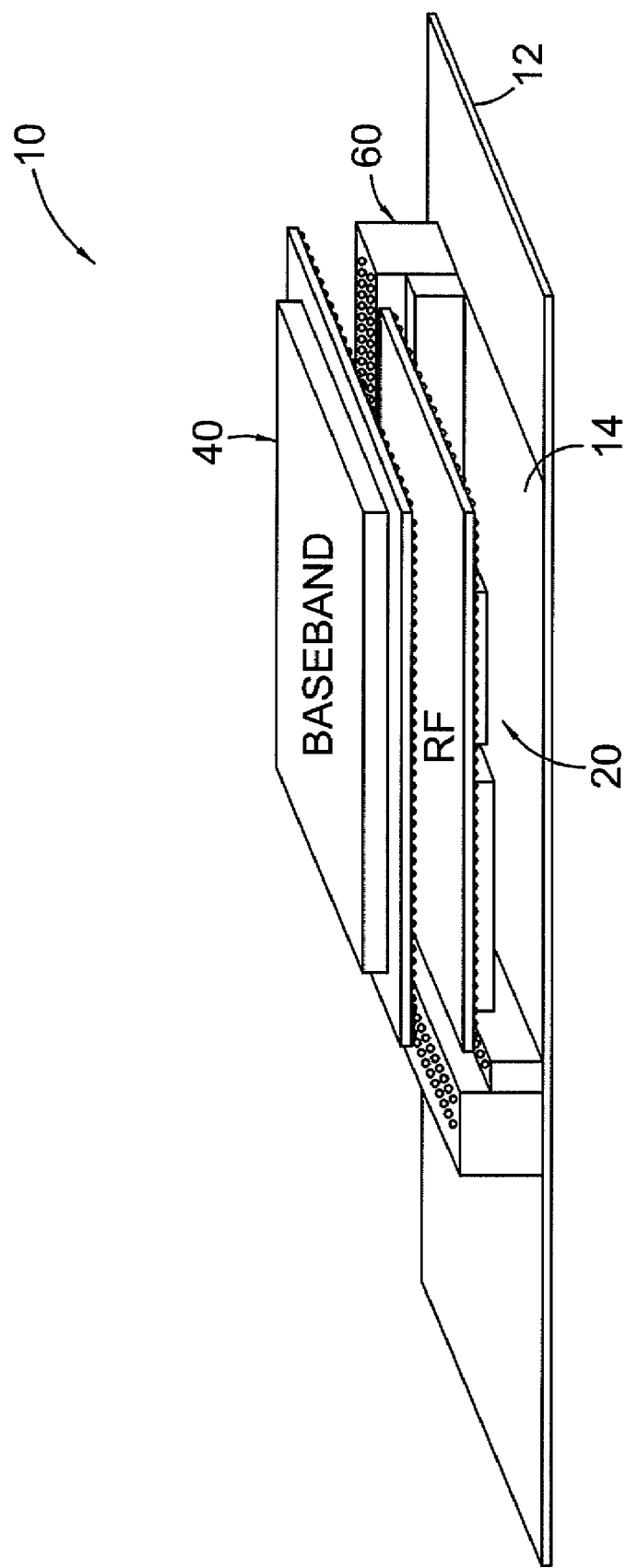
FIG. 1 is a perspective view of a communication circuit including a core modem assembly according to one embodiment of the present invention.
Figure 2:
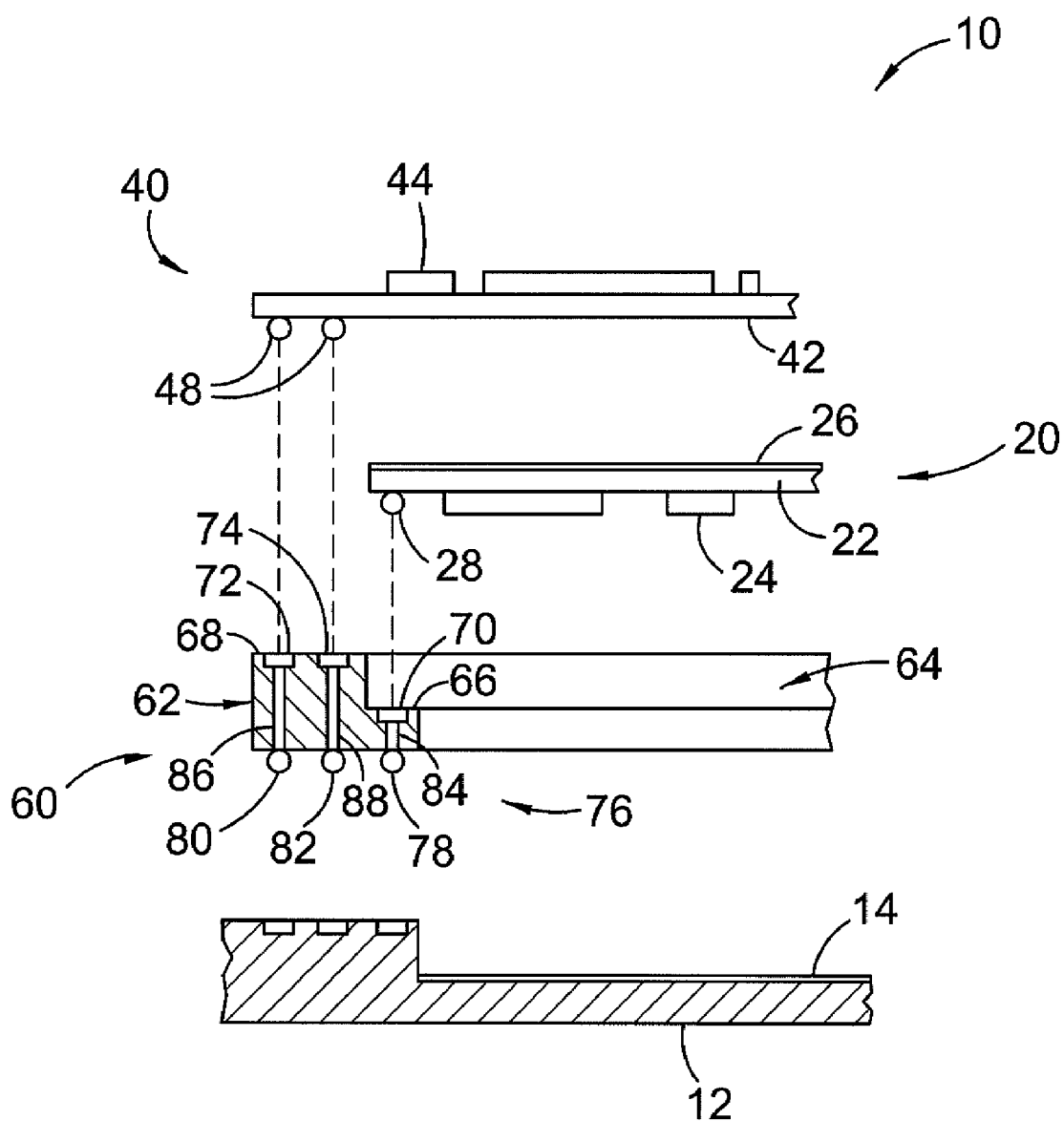
FIG. 2 is an exploded section view of the core modem assembly according to a first embodiment.
Figure 3:
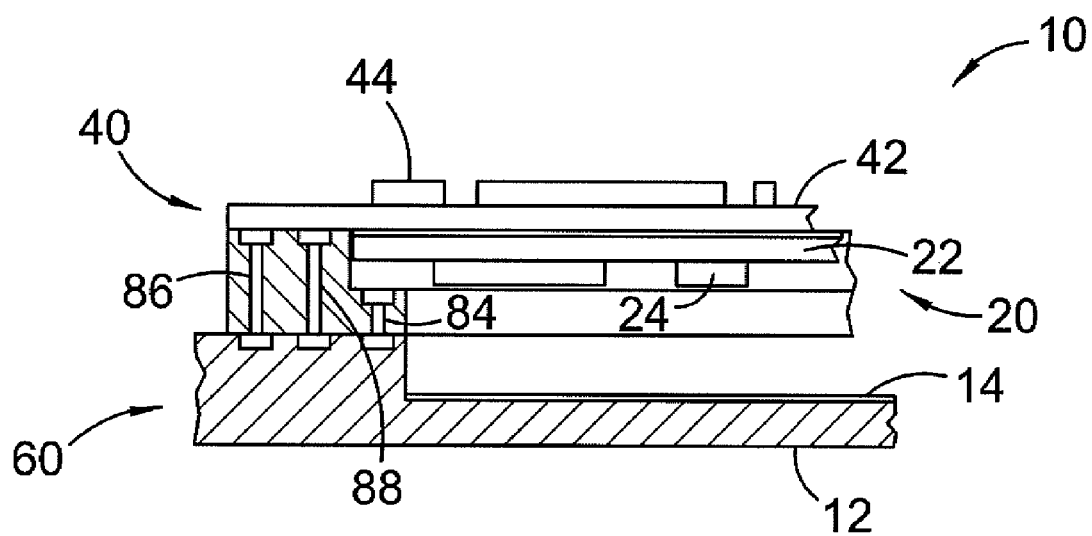
FIG. 3 is a section view of the core modem assembly according to the first embodiment with the components assembled together.

Referring now to the drawings, FIGS. 1-3 illustrate a communication circuit and core modem assembly 10 suitable for a mobile communication device, e.g., a cellular phone, personal digital assistant, laptop computer, hand-held computer, etc., according to one exemplary embodiment of the present invention. The communication circuit comprises a main circuit in a printed circuit board or other substrate (e.g., flex circuit, LTCC, etc.) 12 and a core modem assembly 10 mounted to the printed circuit board 12. Core modem assembly 10 generally comprises an RF module 20, a baseband module 40, and a socket connector 60 for mounting the RF module 20 and baseband module 40 to the printed circuit board 12. As described in greater detail below, the core modem assembly 10 provides electrical isolation between the baseband module 40 and RF module 20 while maintaining a small form factor.

RF module 20 contains the RF components 24 of a radio frequency transceiver. The RF module 20 comprises a substrate 22 having a bottom surface and a top surface. Substrate 22 may comprise, for example, a printed circuit board, flex circuit, or LTCC. RF components 24 mount to the bottom surface of the substrate 22. In some embodiments of the invention, a copper foil layer on the top surface of the substrate 22 forms a ground plane 26, which helps to electrically isolate the RF components after the core modem assembly is assembled. A ball grid array (BGA) 28 is formed on the bottom surface of the substrate 22 along the perimeter thereof. The ball grid array 28 provides electrical connection with the socket connector 60 as will be hereinafter described. In the exemplary embodiment shown, ball grid array 28 includes a single row of solder balls disposed around the perimeter of the substrate 22.

Baseband module 40 contains the baseband components (analog and digital) 44 for processing signals transmitted and received by the mobile communication device. The baseband module 40 may also include memory and other circuit components. The baseband module 40 comprises a substrate (e.g., printed circuit board, flex circuit, LTCC, etc.) 42 having a bottom surface and a top surface. Baseband components 44 mount to the top surface of the substrate 22. Memory components and other circuit components may also mount to the top surface of the substrate 42. In some embodiments, a layer of copper foil may be applied to the bottom surface of the substrate 42 to provide a ground plane for electrically isolating the baseband components 44 from the RF module 20. A ball grid array 48 is disposed on the bottom surface of the substrate 42 adjacent the perimeter thereof to provide means for making electrical connections between the baseband module 40 and the socket connector 60. The ball grid array 48 includes two rows of solder balls. The outer row of the ball grid array 48 is used to connect to signal lines in the socket connector 60 as hereinafter described. The inner row of the ball grid array 38 is used to connect to ground lines in the socket connector 60.

Socket connector 60 comprises a generally square or rectangular frame 62 having an interior opening 64 to receive the RF module 20. The socket connector 60 includes two mounting surfaces 66, 68 for mounting the RF module 20 and baseband module 40 respectively. The first mounting surface 66 comprises a recessed mounting surface disposed adjacent the interior opening 64 of the socket connector 60. The top surface of the frame 62 adjacent the outer perimeter of the socket connector 60 forms the second mounting surface 68. The mounting surfaces 66 and 68 are vertically offset to provide a predetermined vertical separation between the RF module 20 and baseband module 40. The vertical separation helps provide isolation between the RF module 20 and baseband module 40.

The socket connector 60, in addition to providing support for the RF module 20 and baseband module 40, also electrically connects the RF module 20 and baseband module 40 to the main circuit on the printed circuit board 12. A first set of signal contacts or pads 70 are disposed on the first mounting surface 66. The first set of contacts 70 form an electrical connection with the ball grid array 28 on the RF module 20 when the RF module is inserted into the socket connector 60. Similarly, the second mounting surface 68 includes a row of second signal contacts 72 and a row of ground contacts 74 that form an electrical connection with the ball grid array 48 on the baseband module 40 when the baseband module 40 is inserted into the socket connector 60.

A ball grid array 76 is disposed on a bottom surface of the socket connector 60 for forming electrical connections with the printed circuit board 12. The ball grid array 76 comprises three rows of solder balls 78, 80, and 82. A first set of signal lines 84 for the RF module (hereinafter the RF signal lines 84) connect the innermost row 78 of solder balls in the ball grid array 76 to the contact pads 70 on the first mounting surface 66. A second set of signal lines 86 for the baseband module 20 (hereinafter the baseband signal lines 86) connect the outermost row 80 of solder balls in the ball grid array 76 to the second set of contacts 72 on the second mounting surface 68. A set of ground lines 88 electrically connect the middle row 82 of solder balls to the ground contacts 74 on the second mounting surface 68 to ground the baseband module 20. Ground lines 88 form a ground wall between the first and second sets of signal lines 84, 86 to prevent unwanted coupling between the RF signal lines 84 and the baseband signal lines 86.

In use, socket connector 60 surface mounts to the printed circuit board 12 so that the solder balls in the ball grid array 76 make electrical contact with pads on the printed circuit board 12. Heat may be applied to reflow the solder balls in the ball grid array 76. Alternatively, clips or other retaining devices may be used to retain the socket connector 60 on the printed circuit board 12. The printed circuit board 12 may include a ground plane 14 that is disposed below the RF module 20. In some exemplary embodiments, ground plane 14 may be recessed from the top surface of the printed circuit board 12.

After the socket connector 60 is mounted, the RF module 20 and baseband module 40 are mounted to the socket connector 60. RF module 20 inserts into the interior opening 64 of the socket connector 60 and is sized to rest on the recessed mounting surface 66. The ball grid array 28 on the RF module 20 makes electrical contact with the signal contacts 70 on the first mounting surface 66. Heat may be applied to reflow the solder balls in the ball grid array 28. Alternatively, clips or other retaining devices may be used to retain the RF module 20 in the socket connector 60.

The final step in the assembly of the core modem assembly 10 is to mount the baseband module 40. After the RF module 20 is securely in place, the baseband module 40 is mounted to the second mounting surface 68. The outer row of solder balls in the ball grid array 48 on the baseband module 20 make electrical contact with the signal contacts 72 on the second mounting surface 68. The inner row of solder balls make electrical contact with the ground contacts 74. Heat may be applied to reflow the solder balls in the ball grid array 48. Alternatively, clips or other retaining devices may be used to retain the baseband module 40 in the socket connector 60. Another alternative is to provide a lid or cover (not shown) to retain the baseband module 40 in the socket connector 60.

The core modem assembly 10 according to the present invention provides isolation between the RF module 20 and the baseband module 40 when the core modem assembly 10 is assembled on the printed circuit board 12 as shown in FIG. 3. More particularly, the ground plane 14, ground plane 26, and the ground wall 88 of the socket connector 60 form a shielded enclosure around the RF module 20 that dissipates the undesired electromagnetic signals emanating from the RF module 20. The ground wall 88 also provides electrical isolation between the signaling paths for the RF module 20 and baseband module 40.

Figure 4:
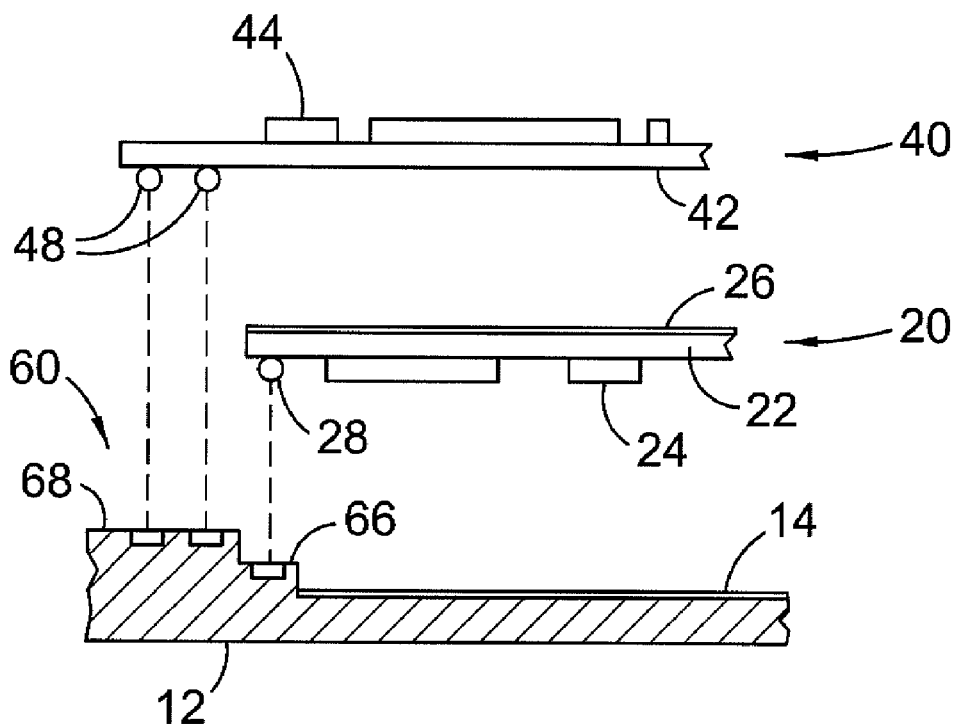
FIG. 4 is an exploded section view of the core modem assembly according to a second embodiment of the invention.

FIG. 4 illustrates an alternate embodiment of the present invention. In this embodiment, the socket connector 60 is integrally formed with the printed circuit board 12. The RF module 20 and baseband module 40 mount directly to the printed circuit board 12. More particularly, the printed circuit board 12 includes a first recessed mounting surface 66 to support the RF module 20 and a second mounting surface 68 (e.g., top surface) to support the baseband module 40. The RF module 20 and baseband module 40 connect to the integrally formed socket connector 60 as described above.

The present invention may, of course, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A core modem assembly for a communication circuit, said core modem assembly comprising:
   a radio frequency module comprising a first substrate and one or more radio frequency components mounted to a bottom surface of the first substrate;
   a baseband module comprising a second substrate and one or more baseband components mounted to a top surface of the second substrate; and
   a socket connector for mounting the radio frequency module and the baseband module to a main circuit, said socket connector comprising a frame including a first mounting surface for mounting the radio frequency module and
   a second mounting surface higher than the first mounting surface with respect to the main circuit for mounting the baseband module above the radio frequency module to provide a predetermined vertical separation between the radio frequency module and the baseband module,
   each of the first and second mounting surfaces being on a same side of the socket connector away from the main circuit,
   a first set of contacts disposed on the first mounting surface for making electrical connections with the radio frequency module, and a second set of contacts on the second mounting surface for making electrical connections with the baseband module;
   each of the first and second substrates extending outward horizontally beyond the frame in an overlapping arrangement.

2. The core modem assembly of claim 1 wherein the first mounting surface is disposed adjacent to an interior opening of the socket connector, and wherein the second mounting surface is disposed adjacent to an outer perimeter of the socket connector.

3. The core modem assembly of claim 1 wherein the socket connector further comprises a third set of contacts on the second mounting surface to provide ground connections for the baseband module.

4. The core modem assembly of claim 3 wherein the second set of contacts are disposed adjacent to an outer perimeter of the second mounting surface and the third set of contacts are disposed adjacent to an inner perimeter of the second mounting surface.

5. The core modem assembly of claim 3 wherein the socket connector further comprises:
   a first set of signal lines to electrically connect the first set of contacts to the main circuit;
   a second set of signal lines to electrically connect the second set of contacts to the main circuit; and
   a set of ground lines to electrically connect the third set of contacts to a first ground plane and to form a ground wall between the first and second sets of signal lines.

6. The core modem assembly of claim 5 wherein the first ground plane is disposed below the RF module when the core modem assembly is mounted to the main circuit.

7. The core modem assembly of claim 3 wherein the main circuit is disposed on a printed circuit board and wherein the first ground plane is disposed on said printed circuit board.

8. The core modem assembly of claim 7 wherein the first ground plane is recessed below the top surface of the printed circuit board.

9. The core modem assembly of claim 5 further comprising a second ground plane disposed between the radio frequency components on the radio frequency module and the baseband components on the baseband module.

10. The core modem assembly of claim 9 wherein the second ground plane is disposed on a top surface of the radio frequency module.

11. The core modem assembly of claim 9 wherein the second ground plane is disposed on a bottom surface of the baseband module.

12. A circuit assembly for a mobile communication device, said circuit assembly comprising:
   a main circuit;
   a radio frequency module comprising a first substrate and one or more radio frequency components mounted to a bottom surface of the first substrate;
   a baseband module comprising a second substrate and one or more baseband components mounted to a top surface of the second substrate; and
   a socket connector for mounting the radio frequency module and the baseband module to the main circuit, said socket connector comprising a frame including a first mounting surface for mounting the radio frequency module, the first mounting surface being disposed in a recess in the frame and adjacent an interior opening of the socket connector, and
   a second mounting surface being spaced a greater distance away from the interior opening than the first mounting surface and being disposed adjacent to the outer perimeter of the socket connector,
   each of the first and second mounting surfaces being on a same side of the socket connector away from the main circuit and the second mounting surface being higher than the first mounting surface with respect to the main circuit for mounting the baseband module above the radio frequency module to provide a predetermined vertical separation between the radio frequency module and the baseband module,
   a first set of contacts disposed on the first mounting surface for making electrical connections with the radio frequency module, and a second set of contacts on the second mounting surface for making electrical connections with the baseband module; and
   a set of ground contacts on the second mounting surface to provide ground connections for the baseband module.

13. The circuit assembly of claim 12 wherein the socket connector further comprises:
   a first set of signal lines to electrically connect the first set of contacts to the main circuit;
   a second set of signal lines to electrically connect the second set of contacts to the main circuit; and
   a set of ground lines to electrically connect the ground contacts to a first ground plane and to form a ground wall between the first and second sets of signal lines.

14. The circuit assembly of claim 13 wherein the first ground plane is disposed below the RF module when the core modem assembly is mounted to the main circuit.

15. The circuit assembly of claim 12 wherein the main circuit is disposed on a printed circuit board and wherein the first ground plane is disposed on said printed circuit board.

16. The circuit assembly of claim 15 wherein the first ground plane is recessed below the top surface of the printed circuit board.

17. The circuit assembly of claim 13 further comprising a second ground plane disposed between the radio frequency components on the radio frequency module and the baseband components on the baseband module.

18. The circuit assembly of claim 17 wherein the second ground plane is disposed on a top surface of the radio frequency module.

19. The circuit assembly of claim 17 wherein the second ground plane is disposed on a bottom surface of the baseband module.

* * * * *